May 1, 1951     N. L. FRENCH ET AL     2,550,989
DETACHABLE PLATE OR DISH RETAINER
Filed April 1, 1949
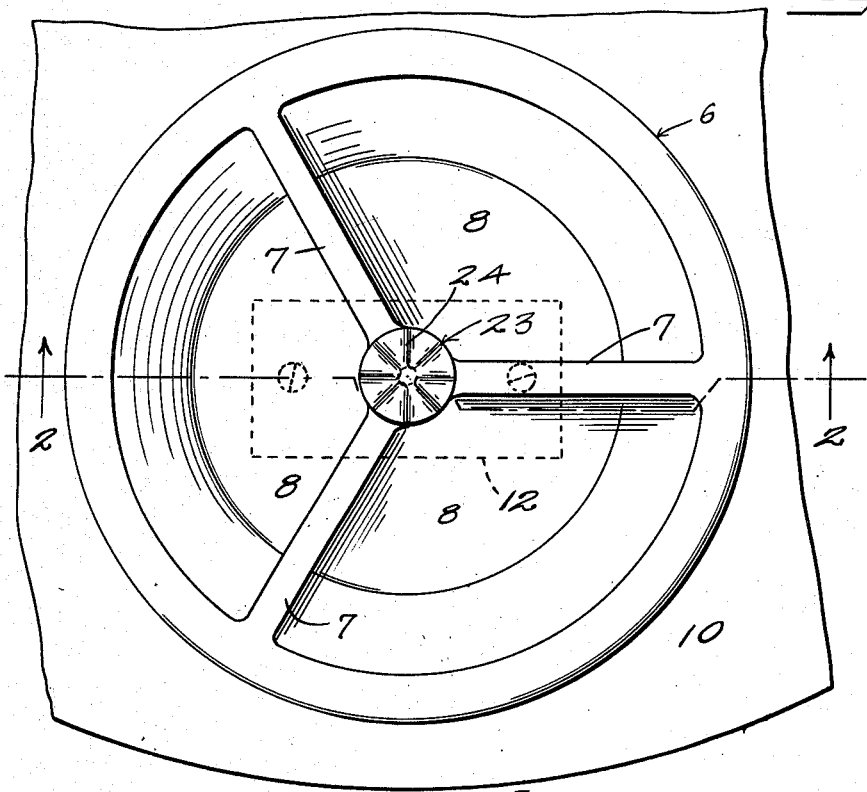
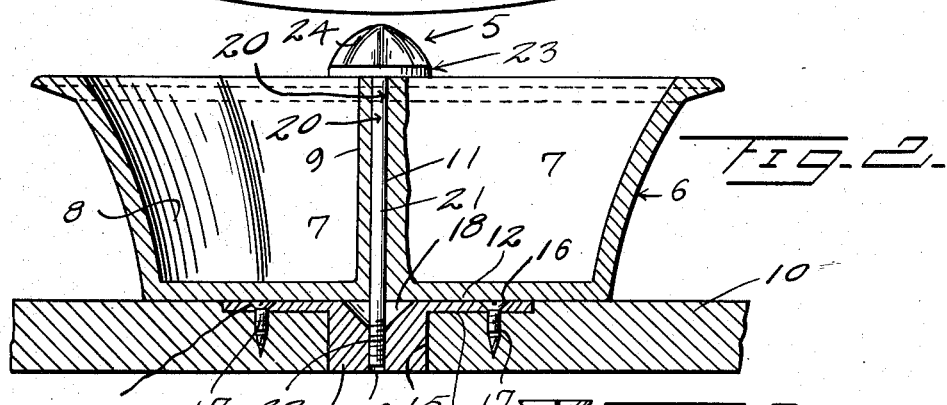
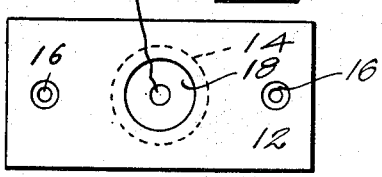
Inventors
N. L. French
H. M. French
By John N. Randolph Patented May 1, 1951

2,550,989

UNITED STATES PATENT OFFICE 2,550,989

DETACHABLE PLATE OR DISH RETAINER

Newton L. French and Helen M. French,
Bisbee, Ariz.

Application April 1, 1949, Serial No. 84,910

2 Claims. (Cl. 65—54)

This invention relates to a detachable retaining device for releasably holding a baby's plate or dish rigidly on a high chair tray, a table or other supporting surface to prevent the baby or child from knocking the dish off of said surface or from upsetting the dish or plate.

More particularly, it is an object of the present invention to provide a dish or plate retainer of extremely simple construction capable of being quickly applied to or removed from a dish or plate and which will efficiently function for accomplishing its intended result.

Another object of the invention is to provide a retaining unit of the aforedescribed character which may be economically manufactured and sold, readily applied, and easily maintained in a clean and sanitary condition.

Various other objects and advantages of the invention will hereinafter become more fully apparent from the following description of the drawing, illustrating a presently preferred embodiment thereof, and wherein:

Figure 1 is a top plan view of a baby's plate shown resting on a supporting surface and rigidly held relatively thereto by the plate or dish retaining means;

Figure 2 is a vertical sectional view taken substantially along a plane as indicated by the line 2—2 of Figure 1;

Figure 3 is a plan view of one element of the invention, and

Figure 4 is a side elevational view of a removable closure for closing the socket of the element shown in Figure 3.

Referring more specifically to the drawing, the plate or dish holder or retainer in its entirety is designated generally 5 and is primarily intended and adapted for use in conjunction with a baby's plate or dish of the type having three radial extending partitions for dividing the dish or plate into three sections or compartments and for the purpose of illustrating an application and use of the retainer or holder 5, such a plate or dish is illustrated in Figures 1 and 2 and designated generally 6 and is shown provided with three corresponding internally disposed radially extending partitions 7 separating the plate or dish into corresponding compartments 8. The radial partitions 7 are formed integral with the dish or plate and merge at the center thereof to define an upstanding central portion 9, as seen in Figure 2. A portion of a high chair tray, table or other suitable surface for supporting the plate or dish 6 is illustrated in Figures 1 and 2 and designated generally 10. The plate 6 is of conventional construction and design except that the upstanding central portion thereof is provided with a substantially centrally disposed bore 11 one end of which opens outwardly of the upper end of said portion 9 and the opposite end of which opens outwardly of the substantially flat bottom of the dish or plate 6.

The dish retainer or holder 5 includes a retainer plate 12 which is adapted to fit into a recess 13 formed in the upper surface of the support 10 and which is provided with a depending boss 14 intermediate of its ends which extends downwardly therefrom through an opening 15 formed in the support 10. The plate 12 is provided adjacent each end thereof with a countersunk opening 16 to receive a screw 17 having a countersink head, which screws are anchored in the support 10 for positioning the upper surface of the plate 12 substantially flush with the upper surface of the support 10 and with the heads of the screws 17 being disposed likewise substantially flush with the upper surface of the plate 12. The boss 14 is provided with a downwardly tapered frusto-conical recess or socket 18 the enlarged end of which opens outwardly of the upper surface of the plate 12 and the lower end of which communicates with a threaded bore 19 which extends downwardly therefrom and which opens outwardly of the lower end of said boss 14.

A screw, designated generally 20, is provided with an elongated shank 21 which extends downwardly through the bore 11 and which is removably mounted therein. The screw shank 21 is provided with a threaded lower end 22 for engagement in the threaded bore 19 and said screw has a head 23 at its upper end provided with a substantially flat underside for engagement with the upper end of the plate portion 9 and the upper side of which is provided with radially extending ribs 24 to afford a finger hold to enable the screw 20 to be turned for applying its threaded portion 22 to the bore 19 or for removing it therefrom and for positioning the underside of the head 23 against the upper end of the portion 9 for securely but detachably fastening the plate 6 on the supporting surface 10 so that the plate or dish will be rigidly retained relatively thereto while in use to prevent an infant or small child, using the plate, from knocking it off of the support 10 or from inverting the dish so as to spill the contents thereof, not shown.

It will be readily apparent that the screw 20 can be removed from the retaining member 12 and extracted from the bore 11 when it is desired to remove the plate or dish from the surface 10 and to prevent foreign matter from accumulating in the recess 18, a temporary closure is provided as illustrated in Figure 4, comprising a screw 25 the threaded shank of which is adapted to detachably engage the bore 19 and the countersink head of which is sized to fit snugly in the upper portion of the recess 18 and so as to be disposed substantially flush with the upper surface of the plate 12, when the plate holder 5 is not in use. It will also be readily apparent that since the bore 19 is open at its bottom, foreign matter will be prevented from accumulating therein.

Various modifications and changes are contemplated and may obviously be resorted to, without departing from the spirit or scope of the invention as hereinafter defined by the appended claims.

We claim as our invention:

1. A dish or plate holder of the character described comprising, in combination with a dish or plate having internal partitions defining a central upstanding portion having a bore extending perpendicularly therethrough and opening outwardly of the upper end thereof and outwardly of the bottom of the dish or plate; said plate holder including a member adapted to be countersunk in and secured to the upper surface of a supporting member and having a depending boss extending downwardly through the supporting member, said boss having an opening extending therethrough and opening outwardly of the upper side of said member and provided with a threaded portion, and a retaining screw extending reciprocally and rotatably through the bore of the plate or dish and having a threaded end detachably engaging in the threaded portion of the opening of said boss, said screw having an enlarged head at its opposite end engaging on the upper end of said upstanding central portion of the dish for releasably retaining the dish stationary and in an upright position on the supporting member.

2. A dish or plate holder as in claim 1, said opening of the boss including an annular flared upper portion disposed above said threaded portion and opening outwardly of the upper surface of said member to guide the threaded end of the screw into engagement with the threaded portion of the opening.

NEWTON L. FRENCH.
HELEN M. FRENCH.

REFERENCES CITED

The following references are of record in the file of this patent:

UNITED STATES PATENTS

| Number | Name | Date |
|---|---|---|
| D. 32,924 | Keeler | July 10, 1900 |
| 164,208 | Portington | June 8, 1875 |
| 662,134 | Rodd | Nov. 20, 1900 |
| 949,025 | Matthews | Feb. 15, 1910 |
| 1,876,264 | Tucker | Sept. 6, 1932 |
| 2,099,635 | Toniolo | Nov. 16, 1937 |
| 2,153,679 | Rich | Apr. 11, 1939 |